J. S. MACLAURIN.
METHOD FOR SEPARATING RESINS FROM IMPURITIES.
APPLICATION FILED DEC. 19, 1917.
1,260,984.
Patented Mar. 26, 1918.
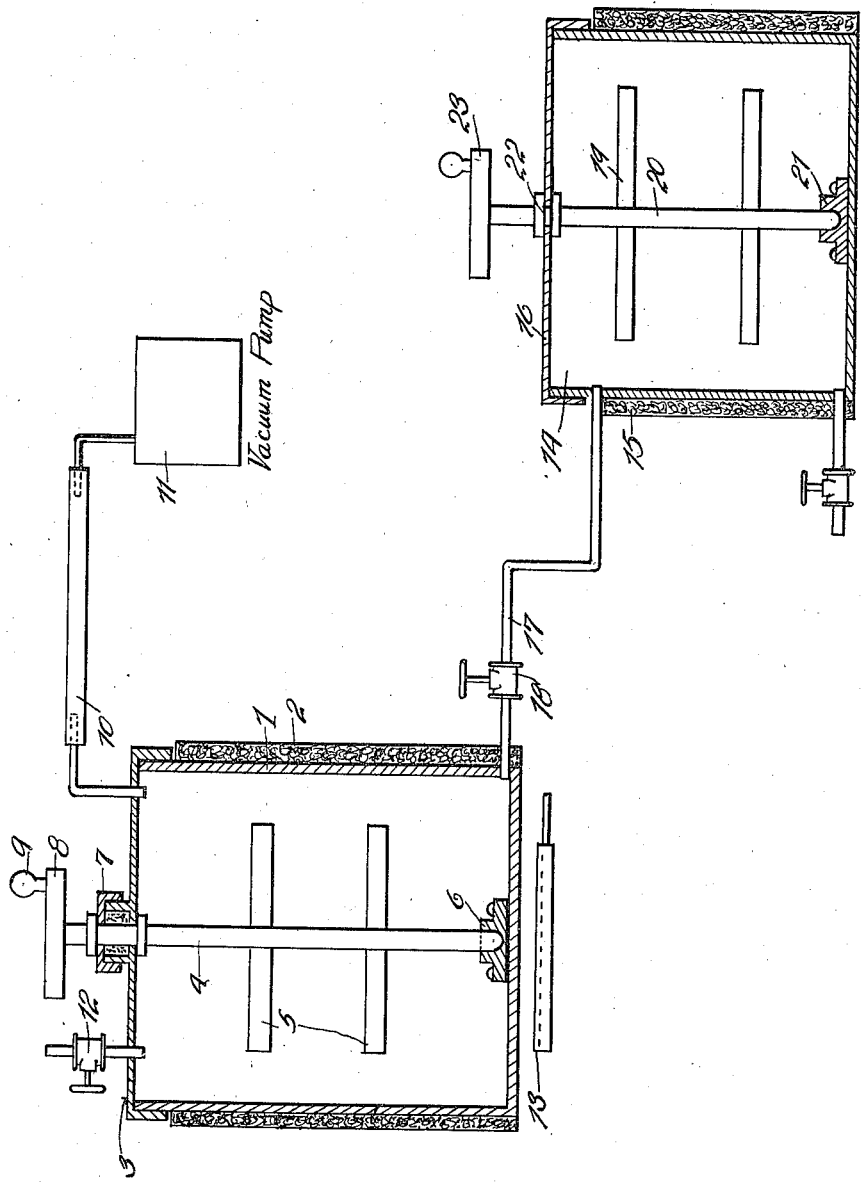

UNITED STATES PATENT OFFICE.

JAMES SCOTT MACLAURIN, OF WELLINGTON, NEW ZEALAND.

METHOD FOR SEPARATING RESINS FROM IMPURITIES.

1,260,984. Specification of Letters Patent. Patented Mar. 26, 1918.

Application filed December 19, 1917. Serial No. 207,960.

*To all whom it may concern:*

Be it known that I, JAMES SCOTT MACLAURIN, a citizen of the Dominion of New Zealand, and residing at 124 Oriental Terrace, Wellington, in the Provincial District of Wellington, in the Dominion of New Zealand, have invented certain new and useful Improvements in Methods for Separating Resins from Impurities, of which the following is a specification.

My invention relates to a process of treating resins, to remove impurities from the same.

In the accompanying drawings, the figure is a central vertical section through apparatus, employed in the practice of my process.

In the drawings, the numeral 1 designates a main tank, preferably surrounded by a heat insulating sleeve or jacket 2, formed of any suitable material. The top of the tank 1 is covered by a lid or cover 3, having an air-tight connection therewith.

The numeral 4 designates a vertical rotatable shaft, extending longitudinally within the tank 1, and carrying agitator blades 5. The shaft 4 has its lower end journaled in a bearing 6, and the shaft extends through a stuffing-box 7, carried by the lid 3. The shaft 4 receives its rotation from a crank-disk 8, carrying a knob 9, for rotating the same. Any suitable means may be employed to rotate the shaft 4.

Connected with the lid 3 is a pipe 10, which leads into the interior of the tank 1, and the opposite end of this pipe is connected with a vacuum pump 11, as shown. A valve 12 is also connected with the lid 3, and when opened serves to admit air into the main tank 1.

Arranged beneath the tank 1 is a heating device 13, such as a gas burner, to heat the contents of the tank 1.

The numeral 14 designates a settling tank, preferably surrounded by a cover or jacket 15, formed of heat insulating material. The settling tank 14 is covered by a lid 16.

A draw-off pipe 17 leads into the lower end of the tank 1 and discharges into the settling tank 14. This pipe is equipped with a valve 18.

Disposed within the settling tank 14 is an agitator, comprising blades 19, carried by a vertical shaft 20. This vertical shaft has its lower end journaled within a bearing 21, and the shaft extends through a central opening 22. A crank-disk 23 is employed to rotate the shaft 20.

In the practice of my process in connection with the apparatus hereinabove described a suitable amount of salt solution is introduced into the tank 1. This salt solution has a slightly higher specific gravity than the resin to be treated, but a lower specific gravity than the heavier impurities present with the resin, such as particles of bark, wood or the like. The finely divided resin with the impurities is now introduced into the salt solution. The cover 3 is closed to render the tank 1 air tight, and the valve 12 is also closed. The vacuum pump 11 is now set into action, and a high degree of vacuum produced in the tank 1. As the air is being exhausted from the tank 1, the agitators 5 are rotated. After as high a degree of vacuum as possible is produced in the tank 1, such vacuum is maintained, and the contents of the tank agitated by revolving the agitators 5, for a period of from approximately 15 minutes to 60 minutes, according to the nature of the impurities to be removed, and their state of division. At the end of this time the valve 12 is opened and air introduced into the shell 1, the agitation being continued, but more slowly.

I have found that good results are obtained by practising the process, as above indicated, but at the end of two or three minutes of admission of air through the valve 12, as above indicated, such valve is closed. When this is done the air is again exhausted from the tank 1, and the agitation continued and increased in speed. The alternate admission and exhaustion of air to and from the tank, as above indicated may be continued, until all particles of the air have been removed from the material under treatment, whereby the resin and foreign matter will become impregnated with the water or salt solution.

I have found that satisfactory results are obtainable by heating the tank 1, during the above described operations, but this heating may be omitted. Heating is accomplished by the use of the burner 13.

After the salt solution with the resin and impurities in suspension therein, have been treated, as above indicated, the valve 18 is opened and the liquid discharged into the settling tank 14. The settling tank 14 is equipped with the heat insulating cover or jacket 15, which is useful, if the solution has been heated, as it prevents the sudden cooling of the tank 14, which would create currents, and unduly agitate the solution. The liquid in the tank 14 is allowed to settle, and the resin will rise to the top of the liquid and may be skimmed therefrom, while the heavier impurities will gravitate to the bottom of the tank 14.

The resin which is thus recovered is thoroughly washed with water to remove the salt therefrom, subsequently to which it is dried.

The impurities which remain in the salt solution may be separated therefrom by filtration or the like, whereby such salt solution may be again employed, if desired.

Having thus described my invention what I claim is:

1. The herein described process of treating resin to remove heavier impurities therefrom, which consists in introducing the resin containing the heavier impurities into a solution of salt and water, said solution having a heavier specific gravity than the resin and a lower specific gravity than the heavier impurities; subjecting the mass to the action of a substantial degree of vacuum; agitating the mass while being subjected to the action of the substantial degree of vacuum; introducing air into the presence of the mass; and agitating the mass in the presence of the air.

2. The herein described process of treating resin to remove heavier impurities therefrom, which consists in introducing the resin containing the heavier impurities into a solution of salt and water, said solution having a heavier specific gravity than the resin and a lower specific gravity than the heavier impurities; subjecting the mass to the action of a high degree of vacuum for a period of approximately from 15 to 60 minutes; agitating the mass during the period of vacuum treatment; introducing air into the mass; subjecting the mass in the presence of the air to a lower agitation; allowing the mass thus treated to settle; removing the resin which rises to the upper portion of the mass; and washing the resin to remove the salt therefrom.

3. The herein described process of treating resin to remove heavier impurities therefrom, which consists in introducing the resin containing the heavier impurities into a solution of salt and water, said solution having a heavier specific gravity than the resin and a lower specific gravity than the heavier impurities; subjecting the mass to the action of a high degree of vacuum for a period of approximately from 15 to 60 minutes; agitating the mass during the period of vacuum treatment; introducing air into the mass for a period of approximately 2 to 3 minutes in the presence of agitation; again subjecting the mass to the action of a high degree of vacuum in the presence of agitation; allowing the mass thus treated to settle; removing the resin from the upper portion of the mass; and washing the resin to remove the salt therefrom.

In testimony whereof I have signed my name to this specification in the presence of two witnesses.

JAMES SCOTT MACLAURIN.

Witnesses:
 E. S. BALDWIN,
 I. M. DAVIDSON.